United States Patent [19]

Nagashima

[11] Patent Number: 4,719,516

[45] Date of Patent: Jan. 12, 1988

[54] IMAGE PROCESSING APPARATUS

[75] Inventor: Nao Nagashima, Yokohama, Japan

[73] Assignee: Canon Kabushiki Kaisha, Tokyo, Japan

[21] Appl. No.: 837,745

[22] Filed: Mar. 10, 1986

Related U.S. Application Data

[63] Continuation of Ser. No. 451,263, Dec. 20, 1982, abandoned.

[30] Foreign Application Priority Data

| Dec. 25, 1981 | [JP] | Japan | 56-209034 |
| Dec. 25, 1981 | [JP] | Japan | 56-209035 |
| Dec. 25, 1981 | [JP] | Japan | 56-209036 |
| Dec. 25, 1981 | [JP] | Japan | 56-209037 |
| Dec. 25, 1981 | [JP] | Japan | 56-209038 |
| Dec. 25, 1981 | [JP] | Japan | 56-209039 |

[51] Int. Cl.$^4$ .............................................. H04N 1/40
[52] U.S. Cl. .................................... 358/780; 358/283
[58] Field of Search ............... 358/280, 257, 256, 283; 400/692, 67, 121, 124

[56] References Cited

U.S. PATENT DOCUMENTS 3,751,582  8/1973  Wermikoff et al. ................ 358/257

Primary Examiner—Edward L. Coles, Sr.
Attorney, Agent, or Firm—Fitzpatrick, Cella, Harper & Scinto

[57] ABSTRACT

An image processing apparatus, such as a copier or the like, in which the information concerning image processing, particularly the program for sequence control is stored in a non-volatile memory detachable from the apparatus.

25 Claims, 21 Drawing Figures

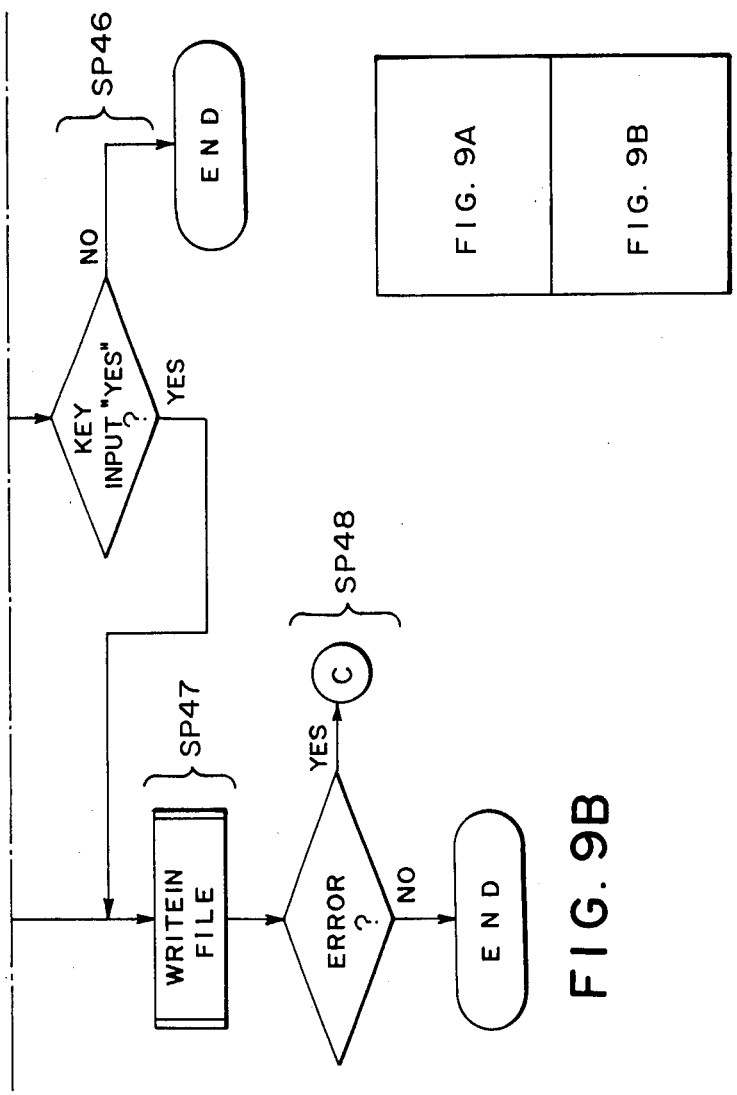

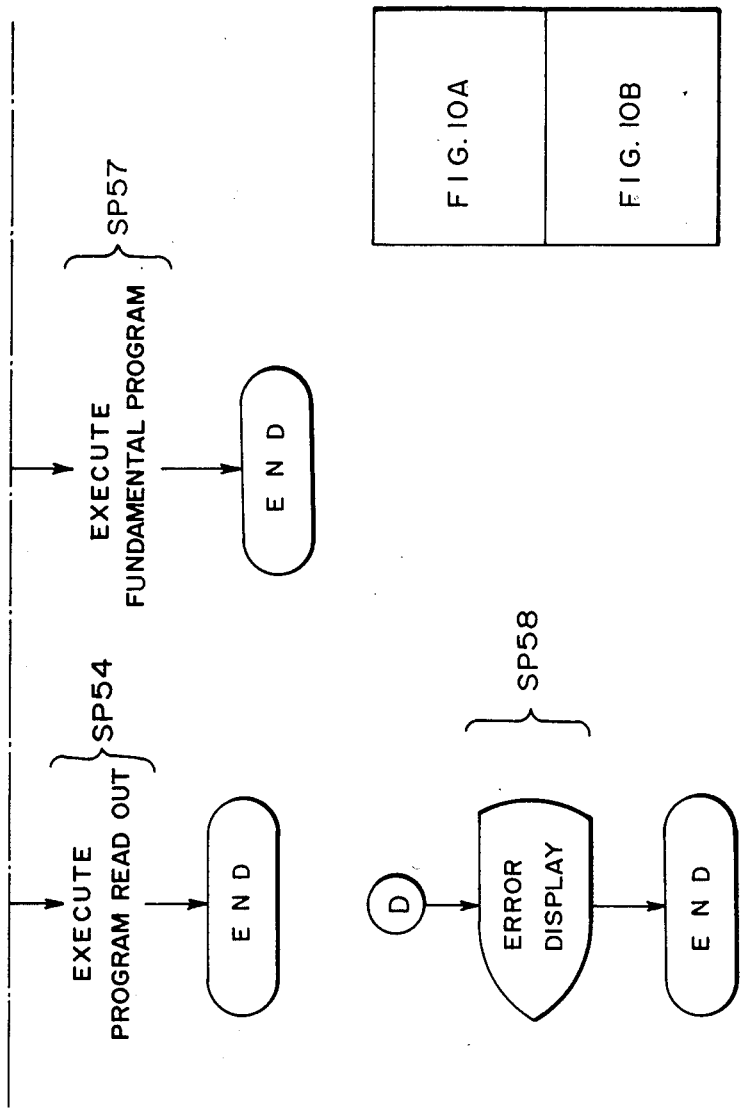

IMAGE PROCESSING APPARATUS

This is a continuation of application Ser. No. 451,263, filed Dec. 20, 1982, now abandoned.

BACKGROUND OF THE INVENTION

1. Field of the Invention

The present invention relates to an image processing apparatus capable of reproducing an image after processing image information in a desired manner.

2. Description of the Prior Art

In recent years it is proposed to effect sequence control of a copying apparatus with a microcomputer or the like, according to a sequence program previously stored in a read-only memory. However, with the increase in the functions of the apparatus, such as modifications in image size and both side copying, the program becomes more complex and requires a larger capacity in the read-only memory.

Also certain functions are not necessary according to the mode of use, so that the capacity of the read-only memory is often wasted for such unnecessary functions.

It was also recently proposed to digitize an image by means of modern digital electronic techology and to reproduce said image after various processing. In such digital image processing, the procedure of digital processing is stored as a program in a magnetic disk provided in the apparatus and called back when necessary. In such apparatus the central processing unit for controlling the entire apparatus has to bear a significant load since the control program and the digital image data are stored in and read from the same magnetic disk.

Also a program composing unit for preparing and composing the program is connected integrally or through a cable with a digital image processing unit and cannot therefore be used singly for the preparation or composition of the program. Also, the necessity of data exchange between said program composing unit and the digital image processing unit inevitably enlarges the entire apparatus and complicates the control means, causing increased complexity of operation of the apparatus.

Furthermore the program thus prepared is stored in a memory inside the apparatus and cannot be utilized in other apparatus.

Also the use of an electromagnetic counter is already known in the control of an electrophotographic copier. The copier is constructed in such a manner as to be inoperable without such counter, which, when connected to said copier, records the number of copies and is utilized for calculating copy charges. Such control method is however, unsatisfactory for an image processing apparatus having various programs for image processing.

SUMMARY OF THE INVENTION

In consideration of the foregoing, an object of the present invention is to provide an image processing apparatus allowing easy operation with a simple structure.

Another object of the present invention is to ensure control of an image processing apparatus.

Still another object of the present invention is to separate the prepared image processing program from the image information, thereby enabling easy use of said program in another apparatus.

Still another object of the present invention is to enable effective use of a memory incorporated in the image processing apparatus.

Still another object of the present invention is to enable easy discovery of an error in operation at the image processing.

The foregoing and still other objects of the present invention will become fully apparent from the following description.

DETAILED DESCRIPTION OF THE PREFERRED EMBODIMENTS

Now the present invention will be clarified in detail by an embodiment thereof shown in the attached drawings.

Figure 1:
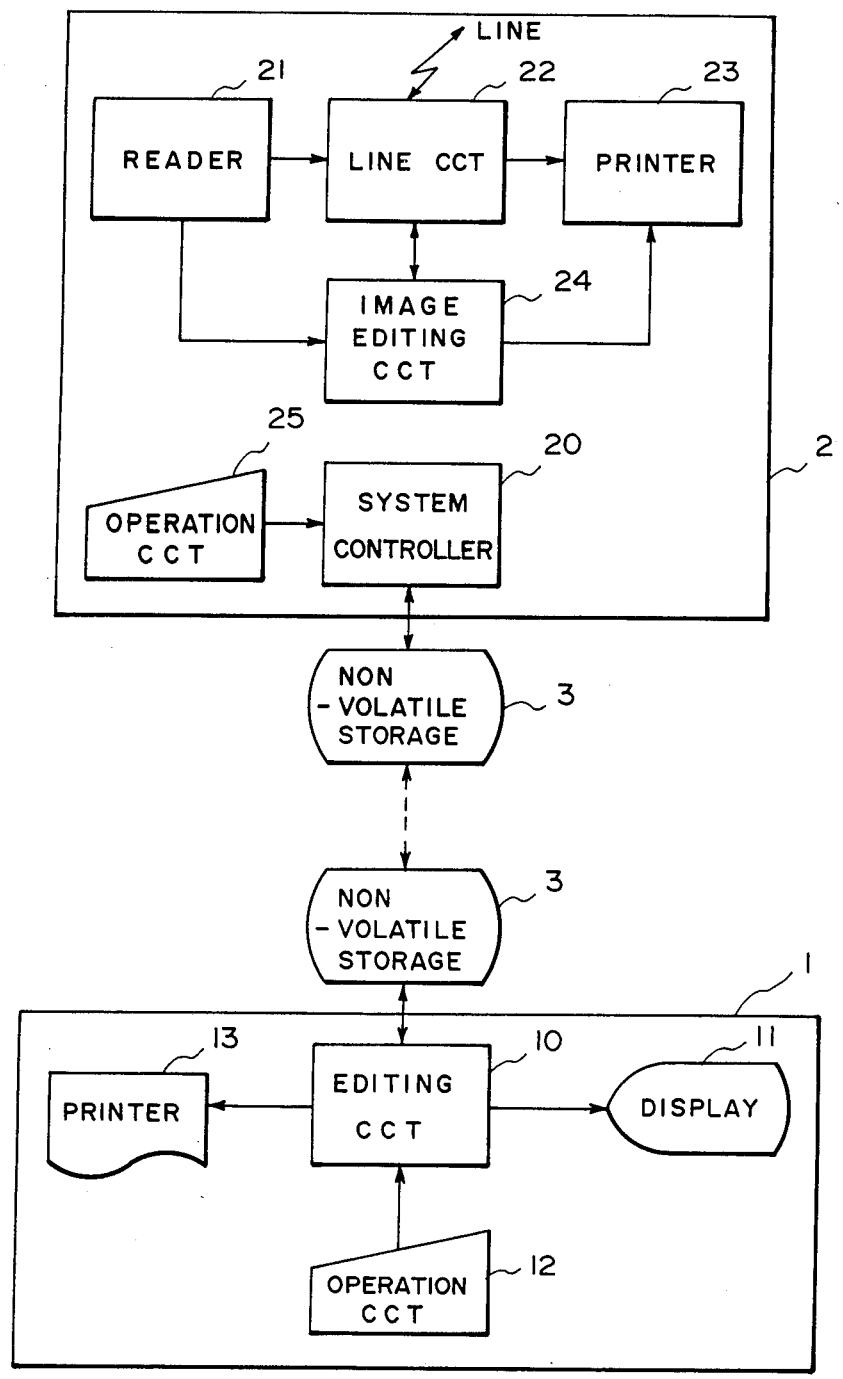
FIG. 1 is a block diagram showing a system embodying the present invention.

FIG. 1 shows a system embodying the present invention, wherein an editing station 1, a digital image processing unit 2 and a non-volatile storage 3 are shown. A program for image processing prepared in the editing station 1 is stored in the non-volatile storage 3. The non-volatile storage 3 is connected to the digital image processing unit 2, and the stored program is read by the processing unit 2 and executed.

The editing station 1 is composed of an editing circuit 10, a display 11 such as a cathode ray tube or a liquid crystal display for use at the preparation of the program, an operation circuit 12 composed for example of a keyboard, a magnetic table etc. and a printer 13. Also the digital image processing unit 2 is composed of a system controller 20, a reader 21 for conducting digital image reading with photoelectric converting means under the control of said system controller 20, a line circuit 22 for exchanging digital image data with another digital image processing unit; a printer 23 for recording a digital image, an image editing circuit 24 for image processing such as positional displacement or storage, and an operation circuit 25. Said printer 23 is composed for example of a laser beam printer or an ink jet printer.

The non-volatile storage 3 is composed for example of Fujitsu bubble cassette FBM43C and is detachably mounted on the editing station 1 and on the digital image processing unit 2. As an example, an integral program for reading an original with the reader 21, extracting a desired portion of the image with the image editing circuit 24, displacing said portion and printing it with the printer 23 is prepared in the editing station 1 and stored in the non-volatile storage 3. (Such image processing program is detailedly disclosed for example in commonly assigned application Ser. No. 311,864, filed Oct. 15, 1981). The non-volatile storage 3 with stored program is detached from the editing station 1, and may be connected to the digital image processing unit 2 when required for program execution. The non-volatile storage 3 may contain plural programs, which can be selectively executed by the digital image processing unit 2.

In this manner the use of the non-volatile storage 3, independent from the editing station 1 and from the digital image processing unit 2, for storing the operation program avoids the requirement for an expensive storage of a large capacity but allows the use of storages of a small capacity in a desired number, and the control of the apparatus is facilitated when plural programs are involved. The non-volatile storage 3 may by composed by a solid-state memory such as the aforementioned magnetic bubble element or an electrically erasable PROM (for example Intel 8255A), thus improving the reliability of the apparatus. In addition to the storage of the operation program, said non-volatile storage 3 may be used for storing the print number for each user or the copy charges, thereby further facilitating the control of the apparatus.

In the conventional electrophotographic copier there is known a function wherein the copier is disabled without a key counter. Said key counter can be replaced by the non-volatile storage 3. The users experienced in the use of such electrophotographic copiers will accept such replacement without significant resistance since both are similar in performance and in form.

Conventionally, there has been required a magnetic disk of an elevated capacity with complicated control for data registration and readout since the above-explained programs and the digital image data are stored in the same magnetic disk. Such drawback can be prevented by the system structure shown in FIG. 1. Also the divided structure of the apparatus simplifies the function and structure of each unit, thus improving the reliability and facilitating the maintenance and control of the entire system.

Also the program prepared at one location and stored in the non-volatile storage can be executed in a distant location or can be commonly used in plural processing units.

Figure 2:
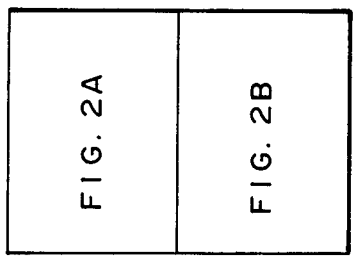
FIG. 2 composed of FIGS. 2A and 2B is a detailed view of an editing station and a digital image processing unit.
Figure 2A:
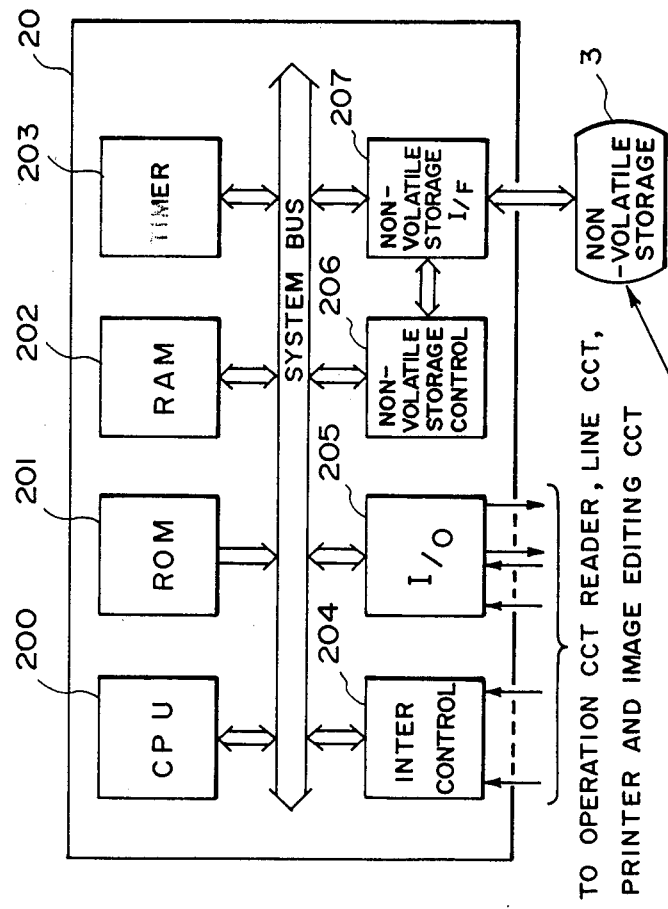
Figure 2B:
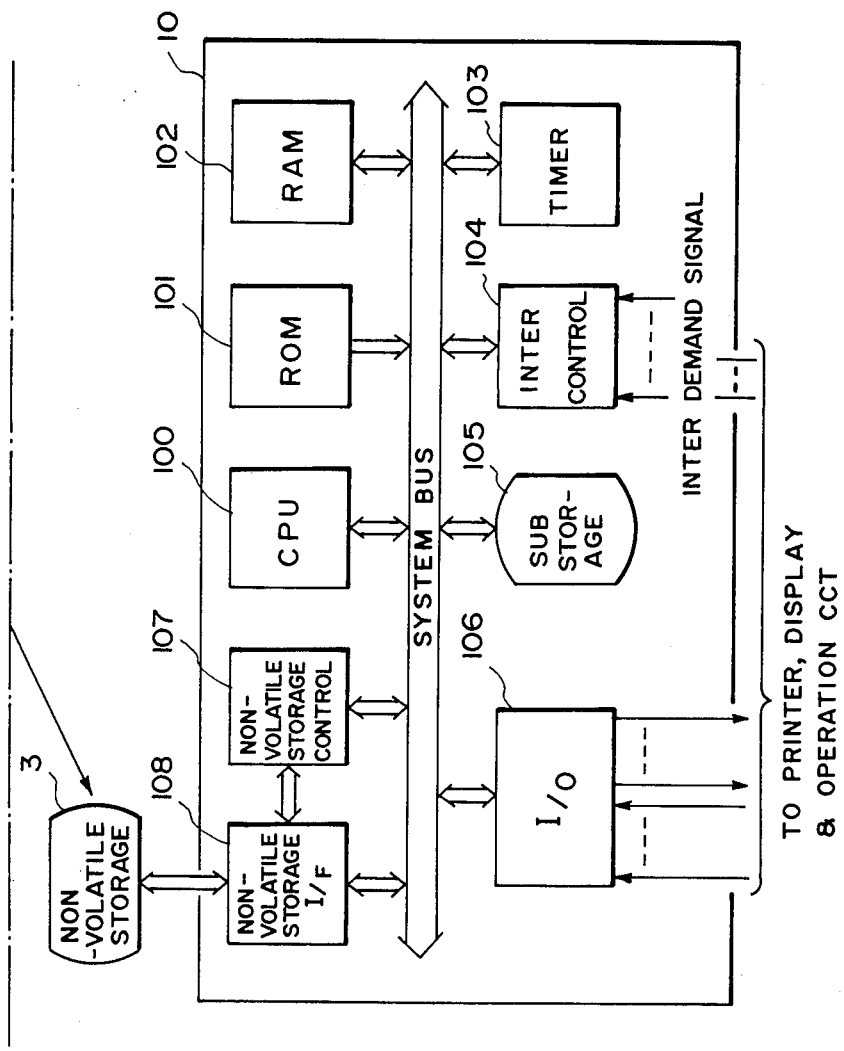

FIG. 2 shows the details of the editing circuit 10 and the system controller 20. The editing circuit 10 is composed of a central processing unit (CPU) 100 composed for example of Intel 8086; a read-only memory (ROM) 101 composed for example of Intel 27128 for storing operating programs; a random access memory (RAM) 102 composed for example of Intel 8148 for storing data; a timer 103 composed for example of Intel 8253; an interruption controller 104 composed for example of Intel 8259A for transmitting an interruption demand to CPU 100; an auxiliary memory composed for example of Intel BPK70; input-output circuit (I/O) 106 composed for example of Intel 8255A for input/output operation with external circuits; a non-volatile storage controller 107 for controlling the data reading from and data storage into the non-volatile storage 3; and a non-volatile storage interface circuit (I/F) 108 for effecting the data reading from and data storage into the non-volatile storage 3 under the control of said non-volatile storage controller 107. The I/O 106 is connected to a display 11, an operation circuit 12 such as a keyboard, a magnetic tablet or the like and a printer 13 for printing a program list etc. which perform various functions according to the programs stored in the ROM 101.

The system controller 20 is composed of a CPU 200 composed for example of Intel 8086, a ROM 201 composed for example of Intel 27128; a RAM composed for example of Intel 8148; a timer 203 composed for example of Intel 8253; an interruption controller 204 composed for example of Intel 8259A; an I/O 205 composed for example of Intel 8255A; a non-volatile storage controller 206 and a non-volatile storage I/F 207. The ROM 201 stores an execution program for reading a program stored in the non-volatile storage 3 and controlling the reader 21, line circuit 22, printer 23 and image editing circuit 24 according said program, and executes the program stored in said non-volatile storage 3 in response to the signals from the operation circuit 25.

Figure 3:
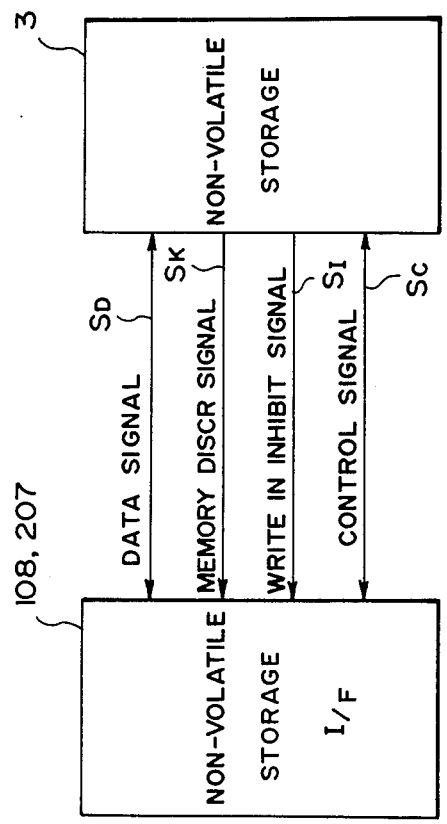
FIGS. 3 and 4 are schematic views showing non-volatile storage.

FIG. 3 shows the signal connections between the non-volatile storage 3 and the non-volatile storage I/F's 108, 207. A data signal $S_D$ performs the receiving and sending of the data to be written into or read from the non-volatile storage and may use a different number of signal lines according to the species of non-volatile storage. A storage discriminating signal $S_K$ identifies if the non-volatile storage 3 is connected, and, if it is connected, identifies the species of said storage and whether it is a read-only memory. A write-in inhibit signal $S_I$ instructs a non-volatile storage capable of re-writing whether a change or an erasure of program or data is possible according to the stored content, and is made selectable by a switch provided outside the non-volatile storage 3.

A control signal $S_C$ controls the non-volatile storage element at the data write-in into or reading from said element.

Figure 4:
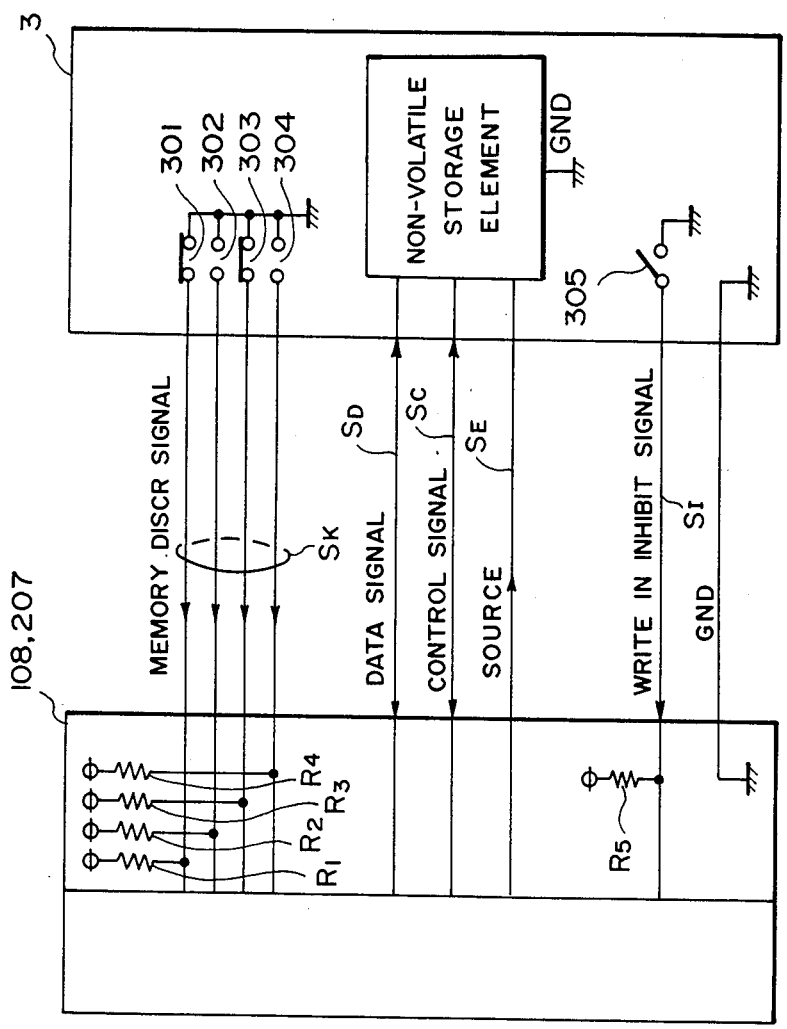

FIG. 4 shows the details of FIG. 3, wherein a non-volatile storage element 300; switches or jumper lines 301–304 for identifying the species of the storage element, and a switch 305 operable by the user for inhibiting the data write-in into the storage are shown. R1–R5 provided in the non-volatile storage I/F 108 and 207 are pull-up resistors for shifting the storage discriminating signal $S_K$ and the storage write-in inhibit signal $S_I$ to the high level when the non-volatile storage 3 is not connected to the I/F's 108, 207, thereby enabling easy identification of the non-connection state.

A power source line $S_E$ supplies power from a device connected to the non-volatile storage 3. It is also possible to incorporate a power source in the non-volatile storage 3.

Figure 5A:
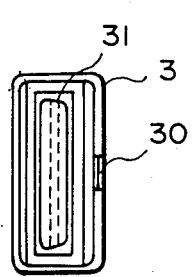
FIGS. 5A-5D are external views of a non-volatile storage.
Figure 5B:
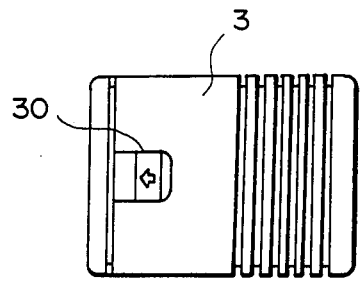
Figure 5C:
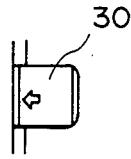
Figure 5D:
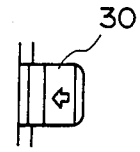

FIGS. 5A and 5B show external views of the non-volatile storage 3, wherein 30 is a write-in inhibit switch corresponding to the switch 305 shown in FIG. 4, which allows data write-in when pulled out in the direction of arrow from the state of (D) to (C). A connector 31 transmits the data signal $S_D$, storage discriminating signal $S_K$, write-in inhibit signal $S_I$, control signal $S_C$ and power supply.

Figure 6:
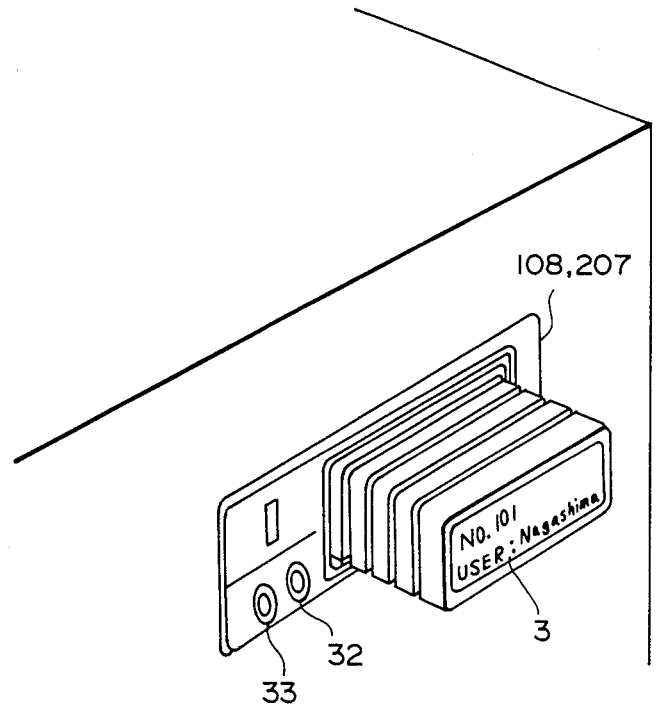
FIG. 6 is an external view of a non-volatile storage and an interface mutually coupled.

FIG. 6 shows a state in which the non-volatile storage 3 is connected to the non-volatile storage I/F's 108, 207. An indicator 32, if lighted, indicates that the write-in into the storage is inhibited. A read/write indicator 33 composed for example of two-color LED indicates that the storage is in signal writing, signal reading or inactive, respectively, when said indicator is lighted red, green or extinguished.

The embodiment shown in FIG. 4, utilizing four lines for the memory discriminating signal $S_K$, is capable of discriminating 16 states including the absence of connection of the non-volatile storage 3. Consequently it is rendered possible to use various memory elements, such as electrically erasable PROM (EEPROM), magnetic bubble memory masked ROM etc. according to the purpose. For example it may be advantageous to use masked ROM's for versatile programs used in large quantity, EEPROM's for customized programs and magnetic bubbles for programs of large capacities. Versatility may be further expanded by providing the non-volatile storage I/F's 108, 207 with exclusive hardwares corresponding to the non-volatile storage 3. In such case the non-volatile storage controllers 107, 206 may suitably select the hardwares of the non-volatile storage I/F's 108, 207 according to the storage element to be used.

Also the storage discriminating signal $S_K$ may be used not only for discriminating the species of the storage element but also for inhibiting the program rewriting and for identifying the presence of a particular program such as for maintenance or for check procedure at the factory. Tab. 1 shows an example of the allocation of values of the storage discriminating signal $S_K$.

TABLE 1

| Value | species of storage | Content |
|---|---|---|
| 0 | EEPROM | Read-only |
| 1 | EEPROM | Re-writable |
| 2 | Magnetic bubble | Re-writable |
| 3 | Masked ROM | Read-only |
| 4 | ... | ... |
| 5 | ... | ... |
| 14 | EEPROM | With self-diagnosis program |
| 15 | No connection | Non-volatile storage not connected |

Now there will be given an explanation on the structure of the memory of the non-volatile storage element 300. In the following explanation, the data such as programs or copy charges to be stored in said element will be called files. Tab. 2 shows an example of file structure in the non-volatile storage element.

TABLE 2

| Index area | | File name |
|---|---|---|
| | | File size |
| | | File species |
| | | Write protect |
| | | File data top address |
| File data area | | |

As shown in Tab. 2, the stored data are classified into two areas: index area including the file name and the top address of the file data, and file data area storing the actual program and data. The index area starts from a particular address, for example the physical first address of the non-volatile storage 3 and is used for controlling the files. More specifically it includes the data, for example, of file name, file size indicating the dimension of the file data area such as 100 byte or 10 blocks, file species indicating the species of the data such as a program or data for copy charges, write protect data indicating whether each file is rewritable, and a file data top address indicating the physical top address of the file data area.

Figure 7:
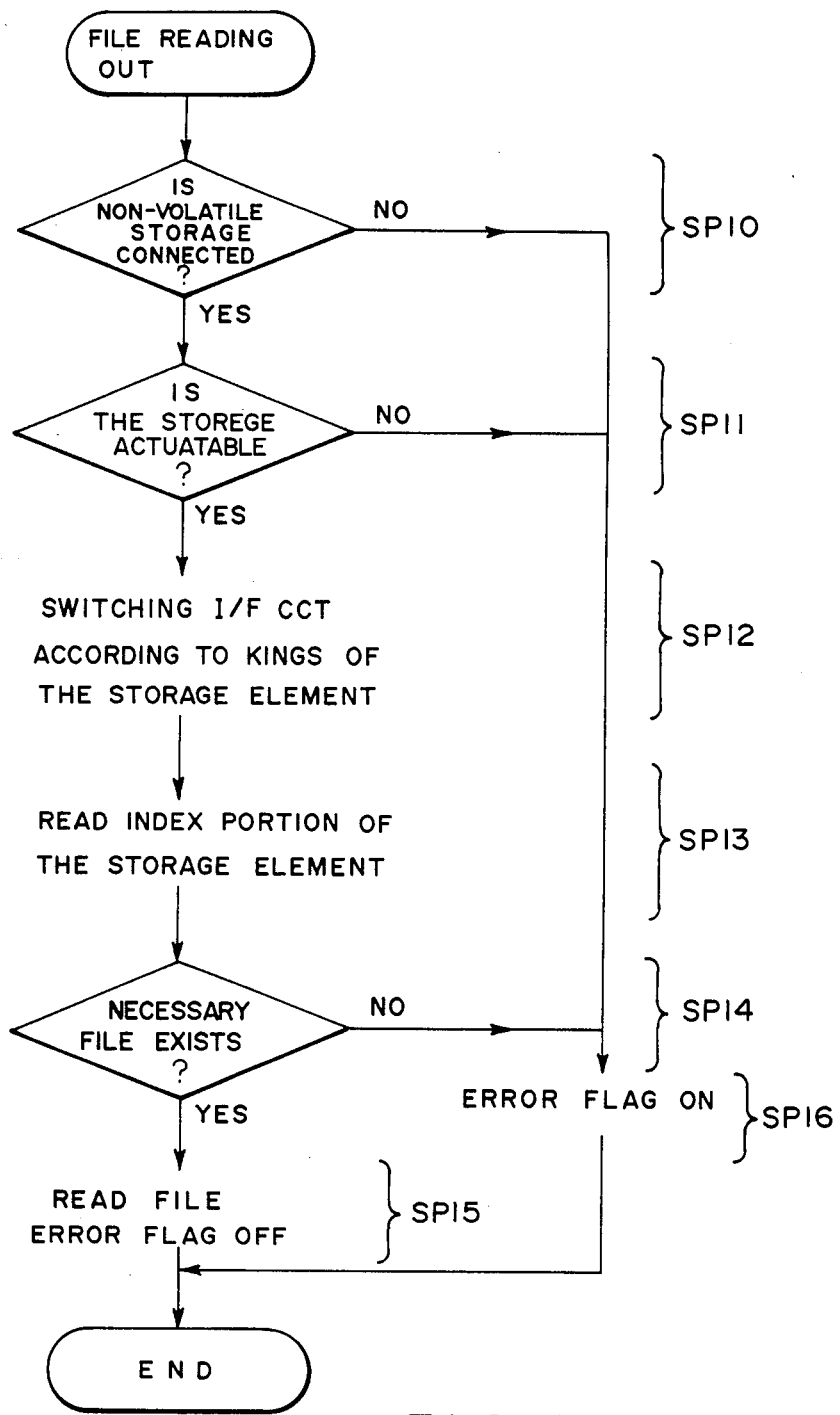
FIG. 7 is a flow chart showing the procedure of file reading.

FIG. 7 shows the procedure of file reading from the non-volatile storage 3. In response to a demand for file reading from said storage 3, a step SP10 for discriminating the aforementioned storage discriminating signal $S_K$ is executed to identify whether the non-volatile storage 3 is connected (In the present embodiment said signal is not 15). If it is not connected, a step SP16 is executed to turn on an error flag to indicate a reading error. On the other hand, if said storage 3 is connected, a step SP11 is executed to identify, from said signal $S_K$, whether the non-volatile storage I/F 108 or 207 is provided with a reading hardware I/F. If reading is impossible, the program proceeds to the step SP16. On the other hand, if reading is possible, a step SP12 is executed to perform switching inside the non-volatile storage I/F 108, 207 to select a hardware I/F corresponding to the connection to the non-volatile storage element. Subsequently a step SP13 reads the index area of the non-volatile storage element, and a step SP14 identifies whether the connected non-volatile storage 3 contains the file necessary for the desired image processing. If not, the program proceeds to the step SP16. On the other hand, if the desired file is present, a step SP15 reads the file data and top address in the index area of the desired file from the storage and simultaneously reads the file data area. Simultaneously the error flag is turned off, indicating that the file reading is completed in normal manner.

The above-described procedure allows automatic reading of the necessary file of the non-volatile storage 3 regardless of the species of the storage 3.

Figure 8A:
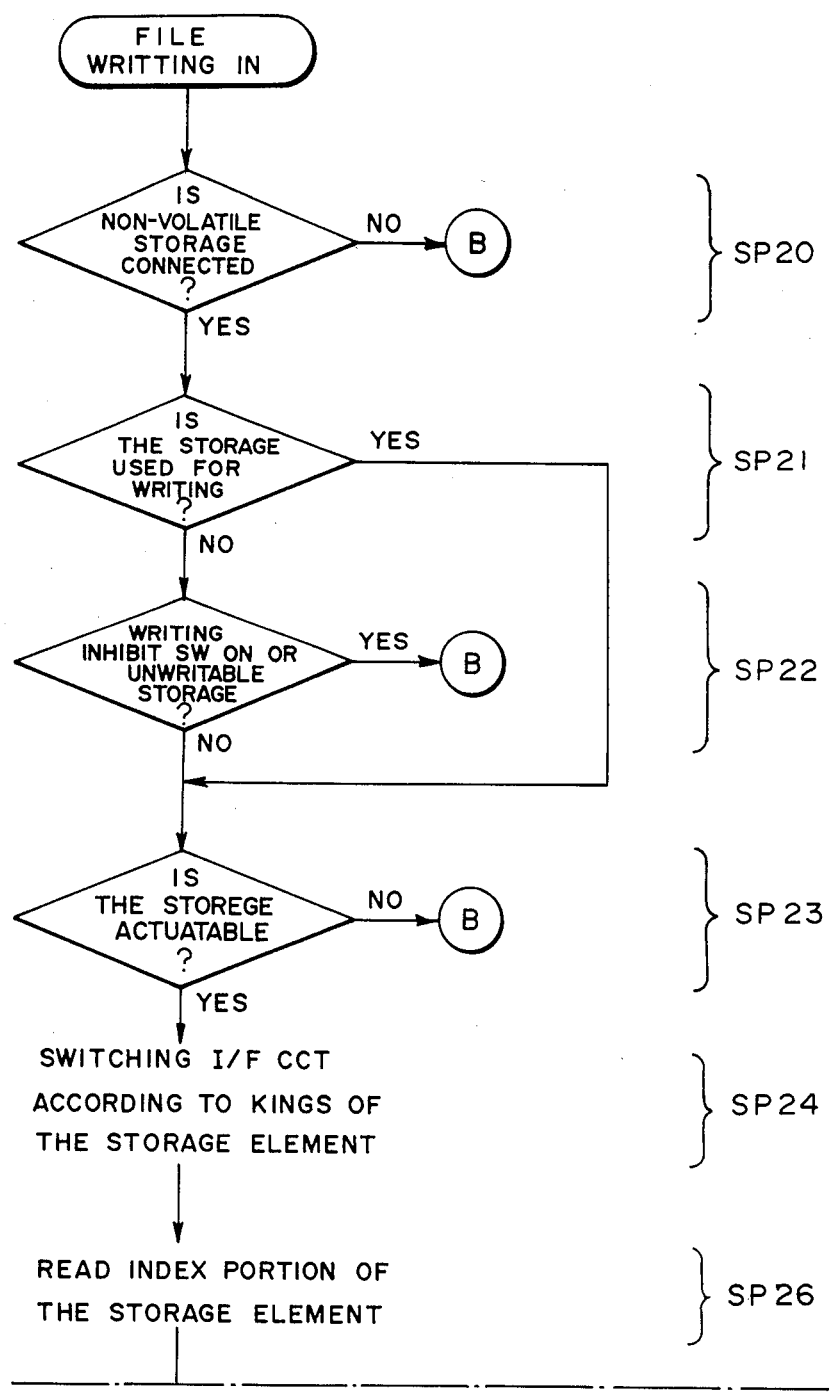
FIG. 8 composed of FIGS. 8A and 8B is a flow chart showing the procedure of file writing.
Figure 8B:
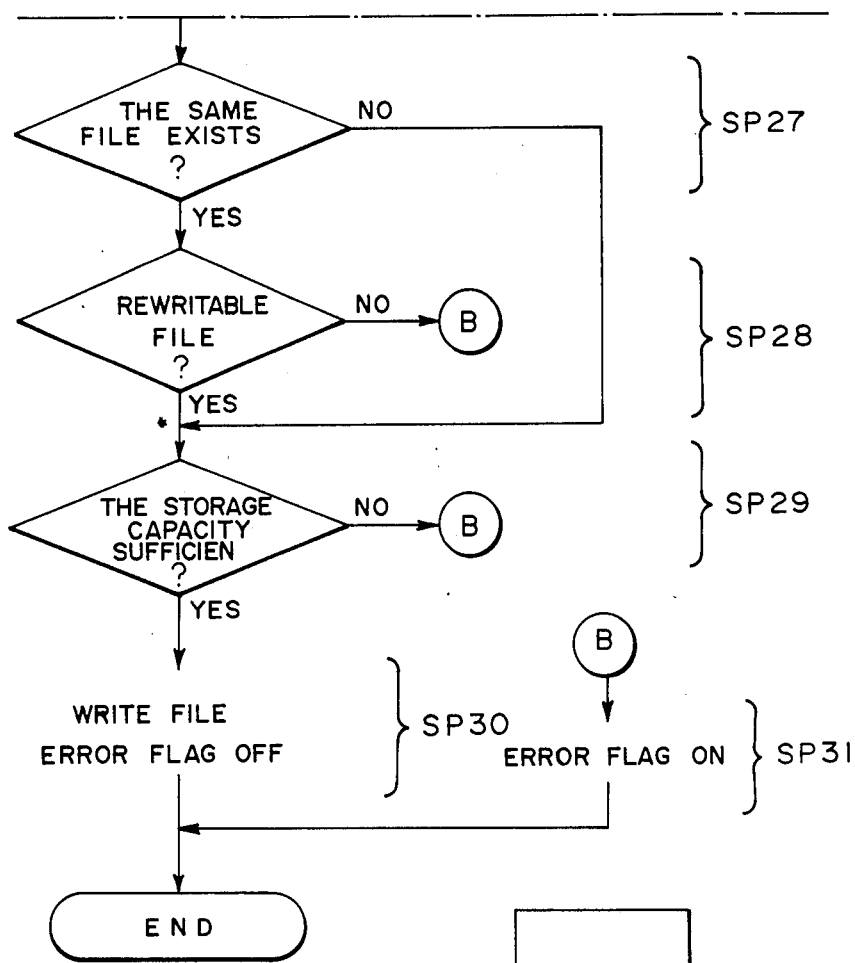
Figure 8:
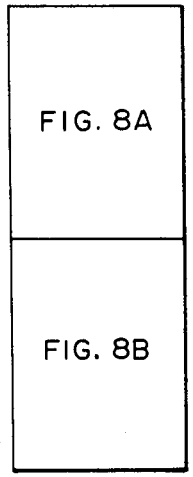

FIG. 8 shows a procedure of file writing into the non-volatile storage 3. In response to a file writing demand, a step SP20 performs a process similar to that in the step SP10. If the storage 3 is not connected, the program proceeds to a step SP31 to turn on an error flag. If it is connected, a step SP21 is executed to identify, from the signal $S_K$, if said storage is a read-write-non-volatile storage, regardless of the state of the write inhibit switch 30, 305. Such read-write non-volatile storage is suitable for a file requiring frequent renewal, such as for copy charges for users or for copy numbers. In case of such storage the program proceeds to a step SP23. A step SP22 identifies if the data writing is inhibited by the inhibit switch 305, or if the non-volatile storage element is physically not writable, for example a masked ROM, from the signal $S_K$. If file writing is impossible, the program proceeds to the step SP31.

On the other hand, if the file writing is possible, a step SP23 identifies the presence of hardware I/F in the storage I/F corresponding to the non-volatile storage element in the same manner as in the step SP11, and, if present, the program proceeds to a step SP24 for switching the circuit. In case of the absence of such hardware, the program proceeds to the step SP31. A step SP26 reads the index area of the non-volatile storage and a step SP27 identifies the presence of a file the same as the demanded one. In case of its presence, a step SP28 is executed to read the write protect code of said index area to identify whether said file is rewritable, and, if it is not, the program proceeds to the step SP31.

In the absence of the same file or in the presence of a same rewritable file, a step SP29 is executed to read the file size, thereby identifying whether new file writing or file renewal exceeds the capacity of the non-volatile storage 3. If the capacity is deficient, the program proceeds to the step SP31. If the capacity is enough, a step SP30 writes index area and file data area, and turns off the error flag.

Figure 9A:
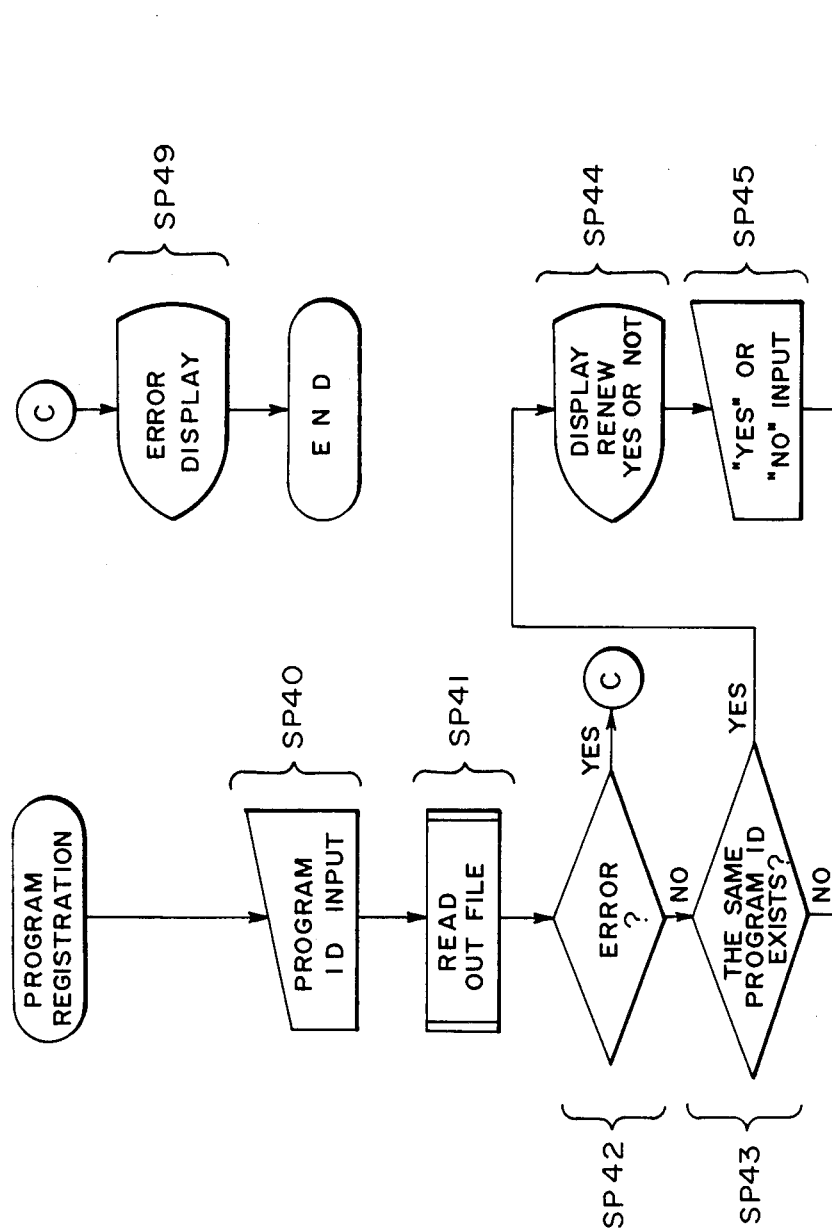
FIG. 9 composed of FIGS. 9A and 9B is a flow chart showing the procedure of program registration.

FIG. 9 shows an example of program registration. The program used herein indicates that to be executed in the digital image processing unit 2. More specifically, said unit selects one of plural programs stored in the non-volatile storage 3 in response to an instruction from the operation circuit 25, and sequentially executes said program to operate the reader 21, line circuit 22, printer 23, and image editing circuit 24 according to a stored procedure. In the present embodiment the editing and registration of the program are conducted in the editing stational, so that the procedure shown in FIG. 8 is conducted by connecting the non-volatile storage 3 to the editing station 1.

Upon entry of a command for registering a program edited in the operation circuit 12 into the non-volatile storage 3, a step SP40 is at first executed to enter the name, number etc. of the program to be registered. A step SP41 identifies whether the non-volatile storage 3 contains a same program or a same file. In case of an inappropriate reading in a step SP42, a step SP49 is executed to indicate an error and the program registration is terminated. A step SP43 identifies the presence of a same program, and, if present, a step SP44 for displaying whether the program can be renewed. Then the program proceeds to a step SP45 to await operation inputs. In case of a key entry "YES" in a step SP46 the program proceeds to a step SP47. In case of a key entry "NO" indicating that the program renewal is not permitted, the program registration is terminated.

In a step SP47 the edited program is wrtitten into the non-volatile storage 3 according to the procedure explained in FIG. 8, and a step SP48 identifies when the write-in is completed in normal manner.

Figure 10A:
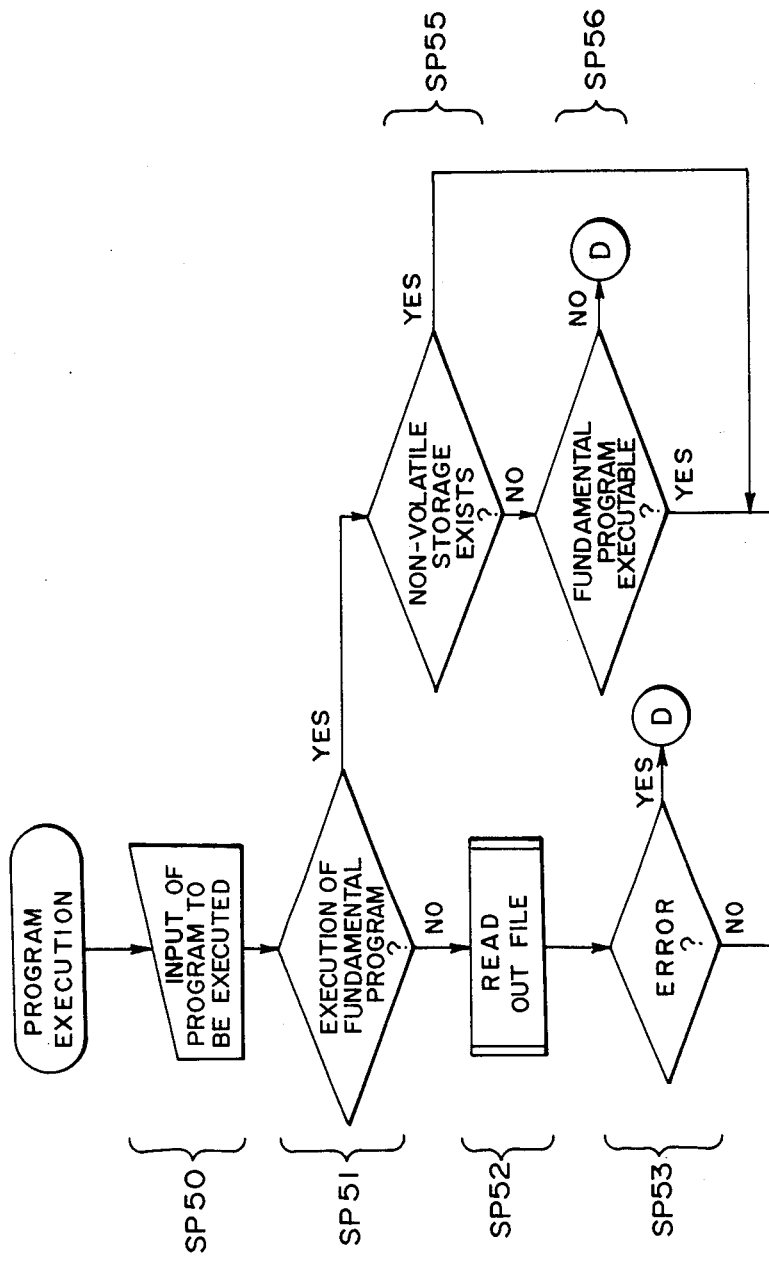
FIG. 10 composed of FIGS. 10A and 10B is a flow chart showing the procedure of program execution.

The non-volatile storage 3 with recorded program is connected to the digital image processing unit 2, and said program is executed in response to the instruction from the operation circuit 25. FIG. 10 shows the procedure of the program execution in the digital image processing unit 2.

A first name, number etc. of the program to be executed are entered in a step SP50. A step SP51 identifies if the entered data indicate a basic program previously stored in the ROM 201. Said basic program is the same in form with the programs stored in the non-volatile storage 3 but is designed to perform relatively simple operations even without the nonvolatile storage 3. Such basic program is used for example for making a copy directly from an original with the reader 21 and the printer 23 in the same manner as in the conventional electrophotographic copier.

In case a program in the non-volatile storage 3 is selected, the program proceeds to a step SP25 to read the program or file according to the procedure shown in FIG. 7. A step SP53 identifies whether the program has been properly read, and, in case of an error, the program proceeds to a step SP58 to indicate an error and to suspend the program execution. In case of proper reading, the program proceeds to a step SP54 to execute the image processing according to the program read from the storage.

In case a basic program is selected, the program proceeds from the step SP51 to a step SP55 to identify, from the signal $S_K$, whether the non-volatile storage 3 is connected. If not connected, the program proceeds to a step SP57. The step SP55, in combination with the succeeding step SP56, inhibits the execution of the basic program in case the nonvolatile storage 3 is not connected, namely inactivating the digital image processing unit 2, equivalent to the conventional key counter. If the non-volatile storage 3 is not connected, the step SP56 identifies whether the basic program can be executed, for example by a switch or the like provided on the system controller 20. If not executable, the basic program is not executed, and the program proceeds to a step SP58. As explained in the foregoing, the execution of basic program is rendered selectable in the step SP56 when the non-volatile storage 3 is not connected. In this manner it is possible to provide flexibility in the control of the digital image processing unit 2, thus facilitating the method of use.

I claim:

1. An image processing apparatus comprising:
   image processing means operable to execute different forms of image processing;
   storage means comprising a solid-state memory, detachable from said image processing apparatus and adapted to store data related to image processing to be executed by said image processing means; wherein said image processing means is arranged to process the image in accordance with the data stored in said storage means when it is attached to said processing apparatus and wherein said image processing means is arranged to be incapable of image processing when there is no said storage means attached thereto; and
   indicator means for providing an indication when said image processing means cannot perform the image processing operation.

2. An image processing apparatus according to claim 1, wherein said storage means is adapted to store plural data each related to the associated one of a plurality of mutually different image processings, and said image processing means is adapted selectively to execute image processings in accordance with one of said plural data.

3. An image processing apparatus according to claim 1, further comprising image reading means for photoelectrically reading the image of the original and for converting the same into electric signals for being processed by said image processing means.

4. An image processing apparatus according to claim 1, further comprising means for designating a desired processing for the image.

5. An image processing apparatus according to claim 4, wherein said image processing means discriminates as to whether or not said storage means attached thereto has stored data relating to the processing designated by said designating means, and processes the image in accordance with the data which is stored.

6. An image processing apparatus according to claim 1, further comprising means for discriminating whether or not said storage means is attached to said image processing apparatus.

7. An image processing apparatus comprising:
   storage means detachable from said image processing apparatus and adapted to store an operational program for use in processing of an image of an original; and
   image processing means arranged to process the original image in accordance with the operational program stored in said storage means attached to said processing apparatus; wherein said processing means cannot perform the image processing operation in the event that said storage means is not attached to said processing apparatus or an unsuitable storage means is attached to said processing apparatus; and indicator means for providing an indication when said image processing means cannot perform the image processing operation.

8. An image processing apparatus according to claim 7, further comprising image reading means for photoelectrically reading the original image and converting the same into electric signals, wherein said image processing means processes said electric signals.

9. An image processing apparatus according to claim 7, wherein any of a plurality of storage means each storing mutually different operational programs are attachable to said image processing apparatus.

10. An image processing apparatus according to claim 7, wherein said storage means includes a solid-state memory in which said operational program is written.

11. An image processing apparatus according to claim 7, further comprising means for discriminating whether or not said storage means is attached to said image processing apparatus.

12. An image processing apparatus comprising:
image processing means operable to execute different forms of image processing; and
storage means, comprising a solid-state memory, detachable from said image processing apparatus and adapted to store data related to image processing to be executed by said image processing means;
wherein said image processing means is arranged to process the image in accordance with the data stored in said storage means when it is attached to said processing apparatus, and wherein said image processing means is arranged to be permitted, when said storage means is not attached thereto, to execute a predetermined image processing operation; and
selecting means for selecting as to whether or not said predetermined image processing operation is to be executed, when said storage means is not attached to said image processing apparatus.

13. An image processing apparatus according to claim 12, further comprising image reading means for photoelectrically reading the original image and converting the same into electric signals, wherein said image processing means processes said electric signals.

14. An image processing apparatus according to claim 12, wherein said storage means is adapted to store plural data each related to the associated one of a plurality of mutually different image processings, and said image processing means performs the image processing operation in accordance with one of said plural data stored in said storage means which is attached to said image processing apparatus.

15. An image processing apparatus according to claim 12, further comprising memory means for storing data for said predetermined image processing operation wherein said image processing means is arranged to perform said predetermined image processing operation, when said storage means is not attached to said processing apparatus, in accordance with the data stored in said memory means.

16. An image processing apparatus according to claim 12, further comprising means for discriminating whether or not said storage means is attached to said image processing apparatus.

17. An image processing apparatus comprising:
storage means detachable from the apparatus and adapted to store an operational program for use in processing an image of an original;
image processing means operable to process an original image in accordance with the operational program stored in said storage means attached to said image processing apparatus; wherein said image processing means is arranged to be permitted to execute a predetermined image processing operation when no storage means is attached to the image processing apparatus; and
selecting means for selecting as to whether or not said predetermined image processing operation is to be executed, when said storage means is not attached to said image processing apparatus.

18. An image processing apparatus according to claim 17, wherein said predetermined image processing operation is to record directly image information read from the original onto the recording material.

19. An image processing apparatus according to claim 17, further comprising image reading means for photoelectrically reading the original image and converting the same into electrical signals, wherein said image processing means processes said electrical signals.

20. An image processing apparatus according to claim 17, further comprising memory means for storing the operational program for said predetermined image processing operation, wherein said image processing means is arranged to perform the predetermined image processing operation in accordance with the operational program stored in said memory means, when said storage means is not mounted on said image processing apparatus.

21. An image processing apparatus according to claim 17, wherein said storage means includes a solid-state memory in which said operational program is written.

22. An image processing apparatus according to claim 17, further comprising means for discriminating whether or not said storage means is attached to said image processing apparatus.

23. An image processing apparatus comprising:
image processing means operable to process an original image in different ways;
storage means detachable from said image processing apparatus and adapted to store mutually different operational programs necessary for performing a plurality of image processings in different ways by said image processing means;
designating means for designating a desired processing for the original image by said image processing means; wherein said image processing means processes the original image, if said storage means attached thereto has stored an operational program necessary for executing the processing designated by said designating means, in accordance with the operational program stored in said storage means; and
indicator means for providing an indication when said storage means does not include the operational program necessary for executing the processing designated by said designating means.

24. An image processing apparatus according to claim 23, further comprising image reading means for photoelectrically reading the original image and converting the same into electrical signals, wherein said image processing means processes said electrical signals.

25. An image processing apparatus according to claim 23, wherein said storage means includes a solid-state memory in which said operational program is written.

* * * * *

UNITED STATES PATENT AND TRADEMARK OFFICE
CERTIFICATE OF CORRECTION

PATENT NO. : 4,719,516            Page 1 of 2

DATED : January 12, 1988

INVENTOR(S) : NAO NAGASHIMA

It is certified that error appears in the above-identified patent and that said Letters Patent is hereby corrected as shown below:

IN THE DRAWINGS:

SHEET 7

Fig. 7, "THE STOREGE" should read --THE STORAGE--.
    Fig. 7, "KINGS" should read --KINDS--.

SHEET 8

Fig. 8A, "THE STOREGE" should read --THE STORAGE--.
    Fig. 8A, "KINGS" should read --KINDS--.

COLUMN 1

Line 25, "techology" should read --technology--.
    Line 54, "is" should read --is,--.

COLUMN 3

Line 18, "by" should read --be--.
    Line 19, "by" should read --of--.

COLUMN 4

Line 15, "according" should read --according to--.

COLUMN 7

Line 9, "stational," should read --station 1,--.
    Line 44, "nonvolatile" should read --non-volatile--.
    Line 65, "nonvolatile" should read --non-volatile--.

UNITED STATES PATENT AND TRADEMARK OFFICE
CERTIFICATE OF CORRECTION

PATENT NO. : 4,719,516

DATED : January 12, 1988

INVENTOR(S) : NAO NAGASHIMA

It is certified that error appears in the above-identified patent and that said Letters Patent is hereby corrected as shown below:

COLUMN 8

Line 6, "basic" should read --the basic--.

Signed and Sealed this

Twenty-third Day of August, 1988

Attest:

DONALD J. QUIGG

*Attesting Officer*  *Commissioner of Patents and Trademarks*